Nov. 18, 1958 T. A. PERRY 2,860,809
TANK BAFFLE
Filed Feb. 14, 1957

INVENTOR
Thomas A. Perry
BY
Kane, Dalsimer and Kane
ATTORNEYS

United States Patent Office 2,860,809
Patented Nov. 18, 1958

2,860,809
TANK BAFFLE

Thomas A. Perry, Babylon, N. Y., assignor to Skyline Products, Inc., Deer Park, N. Y., a corporation of New York Application February 14, 1957, Serial No. 640,266

2 Claims. (Cl. 220—22)

This invention relates to baffles generally and more particularly to a baffle which is designed for use in a tank containing a liquid substance.

Liquids, such as fuels, which are usually shipped in tanks, undergo splashing and surging within the tank due to the movement of the transporting vehicle. Often this movement of liquid within the tank is dangerous since large forces and moments, depending upon the weight of the liquid and the construction of the tank, are developed. In order to increase the shock of the weight of the moving liquid and decrease the surging within the tank, plates are often provided which divide the internal volume of the tank into smaller sections.

When used, baffles are ordinarily fastened to the interior side walls of the tank in various positions in order to resist the movement of the liquid.

Prior to my invention, baffles have been constructed to be attached to the interior side walls of the tank by supports, welding or riveting. The sloshing of fuel back and forth upon these baffles has caused the baffle to function as a large lever acting upon the walls of the tank which has often resulted in failure at the point of attachment. In many instances this has made holes in the sides of the tanks.

My invention consists in the provision of a baffle which is resilient within the tank so that it can withstand the weight of the fluid directly and not transmit strain to the side of the tank.

The invention herein disclosed has as its principal object the furnishing of a new tank baffle which can be easily connected to the interior side walls of the tank and which will not break loose when force is applied thereto.

Another object of this invention is to provide a baffle which can successfully deflect liquid which is directed toward it.

A further object of this invention is to provide a tank baffle which will avoid transmission of strain to the interior side walls of the tank.

Another object of this invention is to provide a tank baffle which is light in weight and which can be firmly fastened to the interior side walls of a tank without the requirement of special supports.

Still another object of the invention disclosed herein is the provision of a tank baffle which is complete in itself and inexpensive so that it can be produced and sold at a comparatively low cost.

Figure 1:
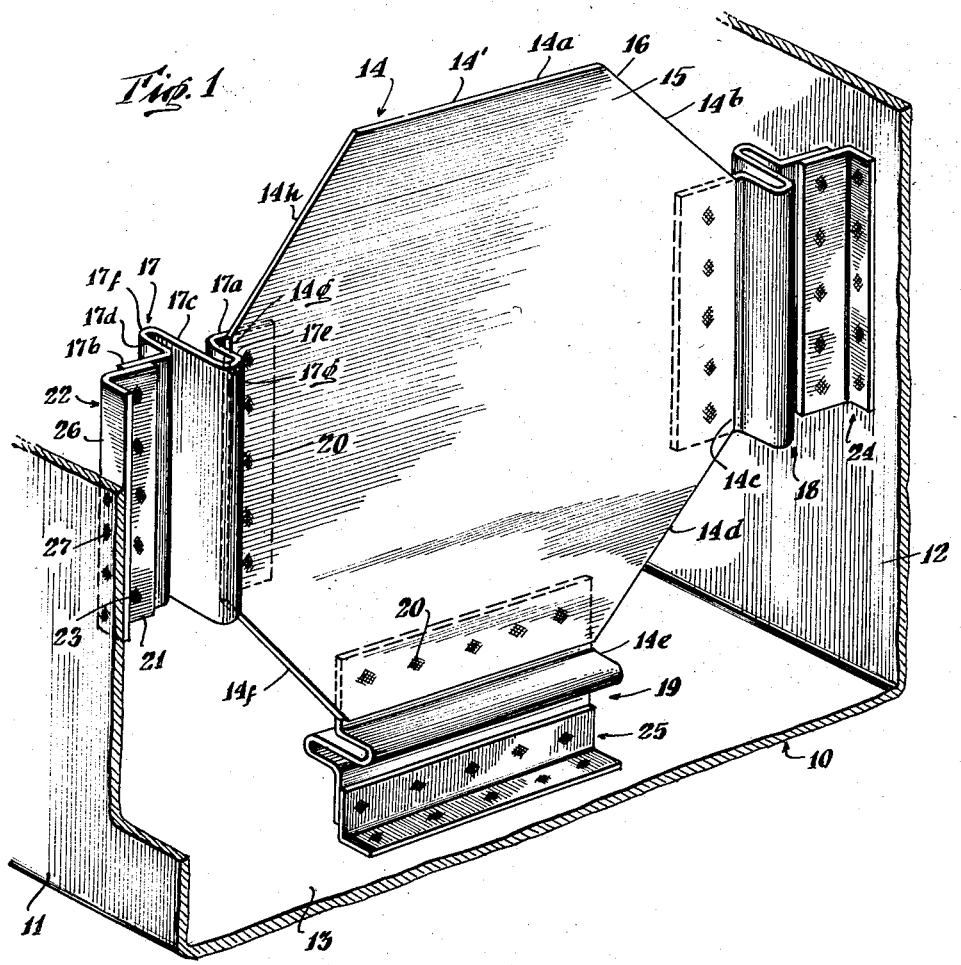
Figure 2:
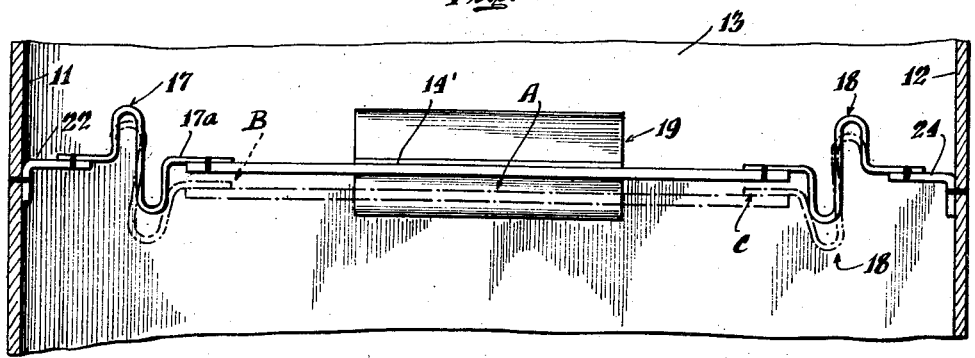

A tank baffle embodying the invention and the manner of using the same is described herein with reference to the drawings in which:

Fig. 1 is a perspective view of a baffle which is constructed in accordance with the teachings of this invention attached to the interior side walls of a tank, with portions of the tank cut away so that the baffle and its attachment to the tank may be viewed; and Fig. 2 is a fragmentary plan view of the tank shown in Fig. 1 with the baffle shown in full lines in its normal position and in phantom in its stressed position.

Tank 10 as shown in Fig. 1 is provided with side walls 11 and 12 and base 13. These walls and the base form a tank which is U-shaped in cross section and elongated. A tank of this particular shape is shown for illustrative purposes only and the length and cross-sectional configuration may be varied as will be seen below.

Baffle 14, which is attached to the interior surface of the tank, has the greater portion thereof designated 14' and formed in the shape of an octagon having sides 14a, 14b, 14c, 14d, 14e, 14f, 14g and 14h. Parallel faces 15 and 16 of octagon 14' are disposed perpendicularly to the walls of tank 10 and attached thereto by means of resilient members 17, 18 and 19, which extend outwardly from the octagon forming extensions thereof.

Resilient members 17, 18, and 19 are identical and each is rigidly fastened to face 16 of the octagon. Resilient member 17 will now be described in detail. However, it should be borne in mind that the description of resilient member 17 applies equally to resilient members 18 and 19.

Resilient member 17 is formed from a single piece of resilient metal and has side flanges 17a and 17b extending from either end thereof in substantially the same plane. Central portion 17c, which is disposed perpendicularly to the plane of side flanges 17a and 17b is joined to these flanges by side portions 17d and 17e respectively, each forming a right angle with the side flange adjacent to it and lying parallel to central portion 17c.

Thus, side portion 17d forms a right angle with side flange 17b and is attached to circular portion 17c by means of U portion 17f, which enables side portion 17d to be disposed parallel to central portion 17c. Likewise side portion 17e forms a right angle with side flange 17a and is attached to central portion 17c by means of U portion 17g which allows it to be disposed parallel to the central portion.

Resilient member 17 is rigidly attached to face 16 of octagon 14' by riveting or otherwise in such manner that central portion 17c and side portions 17d and 17e are parallel to side 14g of the octagon. Resilient members 18 and 19 are also attached to octagon 14' in like manner.

The preferred methed of attaching the resilient members to octagon 14' is riveting and in the figures attachment rivets are indicated by the numeral 20. However, it should be understood that other means may be employed in order to obtain rigid attachment of the resilient members to the octagon.

Side 21 of L bracket 22 is attached to side flange 17b by rivets 23 disposed along the length of a resilient member 17. Likewise L bracket 24 is attached to resilient member 18 and L bracket 25 is also attached to resilient member 19. Base 26 of L bracket 22 is rigidly fastened to the interior surface of side 11 of tank 10 by rivets 27. L brackets 24 and 25 are attached in like manner to the interior surface of the tank at the sides adjacent thereto. Here also it is not necessary for the practice of this invention that rivets be used since any other method of obtaining a rigid attachment may be employed.

Thus, it is seen that with a baffle of the type described above, the main portion thereof, which is the octagon portion, is maintained in resilient manner within the tank. It should be understood that the configuration of the main portion of the baffle can be changed such that the octagon form no longer remains and the precise shape of the resilient members can be altered and still fall within the scope of my invention as defined by the claims herein. The form shown in Fig. 1 is the preferred form however.

Each resilient member is constructed of resilient metal formed with a greater or lesser number of bends as shown in the figures. Also, it is not necessary that the central and intermediate portions which are designated 17c, 17d and 17e in the figures be parallel as long as they form an angle with the main portion of the baffle which is designated 14'. Octagon 14' is formed from any suitable material which can withstand the weight of liquid within the tank with which it is used.

The L bracket which is designated 26 in the figures may be an integral part of the resilient member so that it is a continuation thereof. Since the L bracket is only utilized to fasten the resilient member to the side wall of the tank, a differently shaped attachment member can be used provided it enables the side flange which is adjacent the wall of the tank, such as side flange 17b, to be maintained in such manner that it forms an angle with the tank wall to which it is attached.

As shown in Fig. 2, forces applied to face 16 will cause the baffle to move within the tank within the limits allowed by the resilient member. Thus, a rigid connection between the baffle and the tank is avoided so that the force applied to the face of the baffle is not transmitted as a turning moment to the side of the tank.

The resilient members allow the octagon 14' to move in the direction of the force applied and return to its original position when the force is removed.

The baffle is shown in Fig. 2 in heavy lines representing its unstressed position. Upon application of a force which is designated by the arrow A in Fig. 2, the baffle will move to the position shown in phantom therein and upon removal of force A the baffle can return to its original position. Such a construction prevents the force A from applying a turning moment to the sides of the tank. Such turning moment would result were it not for the resiliency of the baffle.

Arrows designating forces B and C are also shown in Fig. 2. If either of these forces was applied individually, the side of the baffle at which the particular force was applied would move in the direction of the force and return to its original position upon removal of that force.

The provision of the resilient baffle allows the liquid which surges within the tank to be controlled without the undesirable effects to the tank surface which heretofore have resulted. The baffle which is disclosed herein can be easily connected in position within a tank so that it can deflect liquid in any desired direction and avoid transmission of undue strains to the side walls of the tank.

Thus, among others, the several objects of the invention as specifically aforenoted are achieved. Obviously, numerous changes in construction and rearrangement of parts may be resorted to without departing from the spirit of the invention as defined by the claims.

I claim:

1. A baffle for use in connection with a tank containing liquid comprising in combination a liquid deflecting member having a flat surface thereon disposed transversely within said tank and spaced from the interior surface thereof with said flat surface substantially perpendicular the interior surface of said tank; and a resilient member, a flange on said resilient member rigidly attached to said flat surface, a central portion of said resilient member maintaining a position substantially perpendicular to said flat surface and a second flange on said resilient member and means for rigidly attaching said second flange to the interior surface of said tank.

2. A baffle for use in connection with a tank in accordance with claim 1 in which the means for rigidly attaching the second flange to the interior surface of said tank consists of an L bracket having its base rigidly fastened to the interior surface of said tank and its side, which extends perpendicular from said interior wall, rigidly connected to the second flange of said resilient member.

References Cited in the file of this patent

UNITED STATES PATENTS

| 1,040,401 | Perry | Oct. 8, 1912 |
| 2,379,126 | Welden | June 26, 1945 |
| 2,840,259 | Steidl | June 24, 1958 |

FOREIGN PATENTS

| 291,703 | Great Britain | June 7, 1928 |
| 743,640 | Germany | Dec. 2, 1944 |